(12) United States Patent
Bernard et al.

(10) Patent No.: US 12,083,728 B2
(45) Date of Patent: Sep. 10, 2024

(54) METHOD FOR VERIFYING THE ACCURATE MOUNTING OF MOLDING INSERTS TO A TOOLING PLATE OF AN INJECTION-MOLDING APPARATUS FOR MOLDING OPHTHALMIC LENS MOLDS

(71) Applicant: ALCON INC., Fribourg (CH)

(72) Inventors: Jan Bernard, Niedernberg (DE); Michael Stutz, Kleinwallstadt (DE); Thomas Tonn, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 42 days.

(21) Appl. No.: 17/652,729

(22) Filed: Feb. 28, 2022

(65) Prior Publication Data

US 2022/0274307 A1 Sep. 1, 2022

Related U.S. Application Data (60) Provisional application No. 63/155,172, filed on Mar. 1, 2021.

(51) Int. Cl.
| | |
|---|---|
| *B29C 45/84* | (2006.01) |
| *B29C 45/14* | (2006.01) |
| *B29C 45/26* | (2006.01) |
| *B29C 45/80* | (2006.01) |
| *B29D 11/00* | (2006.01) |

(Continued)

(52) U.S. Cl.
CPC ............ *B29C 45/842* (2013.01); *B29C 45/14* (2013.01); *B29C 45/2675* (2013.01); *B29C 45/80* (2013.01); *B29D 11/00951* (2013.01); *G02B 21/0016* (2013.01); *B29C 2945/76096* (2013.01); *B29C 2945/76294* (2013.01); *B29C 2945/76461* (2013.01); *B29C 2945/76943* (2013.01); *B29D 11/0048* (2013.01); *B29L 2011/0041* (2013.01)

(58) Field of Classification Search
CPC ... B29C 45/842; B29C 45/2675; B29C 45/80; B29C 2945/76096; B29C 2945/76294; B29C 2945/7626; B29C 2945/76257; B29C 45/2673; B29D 11/0048; B29L 2011/0041
See application file for complete search history.

(56) References Cited

U.S. PATENT DOCUMENTS

| | | |
|---|---|---|
| 2007/0218157 A1 | 9/2007 | Tsai |
| 2020/0189153 A1 | 6/2020 | Liu et al. |

FOREIGN PATENT DOCUMENTS

| | | | |
|---|---|---|---|
| AT | 14224 U1 | * | 6/2015 |
| DE | 3917361 A1 | * | 9/1990 |
| EP | 0687551 A2 | | 12/1995 |

(Continued)

OTHER PUBLICATIONS

Translation of DE-3917361-A1 (Year: 1990).*
Translation of JP-H0531752-A (Year: 1993).*
Translation of AT-14224-U1 (Year: 2015).*

*Primary Examiner* — John J DeRusso
(74) *Attorney, Agent, or Firm* — Sheng-Hsin Hu (57) ABSTRACT

To achieve molding insert is properly mounted to the tooling plate of the injection molding machine, a sensor head comprising confocal sensors is used. The sensor heads are placed on the tooling plate at the respective position to determine whether the desired mold insert has been mounted to that position and whether the desired mold insert has been precisely and accurately mounted to the tooling plate.

11 Claims, 6 Drawing Sheets

(51) Int. Cl.
 B29L 11/00 (2006.01)
 G02B 21/00 (2006.01)

(56) References Cited

FOREIGN PATENT DOCUMENTS

| | | | |
|---|---|---|---|
| JP | H0531752 A | * | 2/1993 |
| JP | 2010235393 A | | 10/2010 |
| JP | 2012153080 A | | 8/2012 |
| TW | 202021791 A | | 6/2020 |

* cited by examiner

METHOD FOR VERIFYING THE ACCURATE MOUNTING OF MOLDING INSERTS TO A TOOLING PLATE OF AN INJECTION-MOLDING APPARATUS FOR MOLDING OPHTHALMIC LENS MOLDS

FIELD OF THE INVENTION

The present invention generally relates to the field of manufacturing ophthalmic lenses. More specifically, the invention relates to a method and apparatus for verifying whether a molding insert is accurately mounted to a tooling plate of an injection-molding apparatus for molding ophthalmic lens molds.

BACKGROUND OF THE INVENTION

Mass production of ophthalmic lenses, in particular contact lenses such as soft contact lenses, typically is performed with the aid of lens-molding processes. In a lens-molding process a lens-forming material, for example a polymer or pre-polymer solution, may be introduced into a female lens mold which is closed by a corresponding male lens mold and is subsequently cured to form a lens. The lens molds used in lens-molding processes are either for single-use or are re-usable.

Re-usable lens molds are typically glass molds and are expensive (this is why they are re-used a large number of times), whereas single-use lens molds are cheap plastic molds which are normally manufactured using injection-molding apparatuses. In an injection-molding apparatus, a flowable material, for example polypropylene, is injected into cavities formed between tooling plates of the injection-molding molding apparatus at high temperature and high pressure. These cavities define the shape of the lens molds to be formed. After injection, the flowable material rapidly cools down to a solid state to form the lens molds. The tooling plates of the injection-molding apparatus are then moved away from each other whereupon the lens molds are removed from the tooling plates for subsequent use in the manufacture of ophthalmic lenses.

Injection-molded plastic lens molds typically have a front surface comprising a lens-forming surface (male or female) of optical quality defining either the anterior or the posterior surface of the lens, and a back surface comprising a surface located opposite to the lens-forming surface. The cavities defining the shape of the lens molds are typically formed with the aid of inserts mounted to the tooling plates of the injection-molding apparatus, these inserts defining the shape of the lens-forming surface and of the surface opposite thereto.

Accordingly, that insert defining the shape of the lens-forming surface must have a molding surface of optical quality in order to be able to form the corresponding lens-forming surface of the lens mold, whereas that insert defining the shape of the surface located opposite to the lens-forming surface must have a surface of the quality specified for this opposite surface.

The inserts are extremely carefully checked whether they fulfil the required specifications with respect to geometry and integrity of the surface, and only those inserts fulfilling the required specifications are forwarded to the operator mounting the inserts to the tooling plates of the injection-molding apparatus. Otherwise, the plastic lens molds that are injection-molded with the aid of these inserts are unable to fulfil the required specifications and cannot be used for the manufacture of the ophthalmic lenses.

However, even in case the inserts fulfil the required specifications it may occur that the inserts are not absolutely accurately mounted to the tooling plates. For example, in case a plurality of lens molds having different specifications (e.g. base curve or front curve radii) are to be simultaneously produced with the aid of the injection-molding apparatus it must be confirmed that the correct insert is actually mounted to the correct location on the tooling plate in accordance with a given set-up scheme. Also, during mounting of the insert it may occur that small particles (e.g. one or more very small metal chips) get inadvertently wedged between the back surface of the insert and the tooling plate so that the heat transfer from the insert to the tooling plate may be insufficient. This may lead to imperfect lens molds due to insufficient cooling of the plastic material during injection-molding. Overall, if an insert is not accurately mounted to the tooling plate (regardless of the reason) the lens molds produced with such insert do not fulfil the required specifications so that in case these lens molds are used in the manufacture of ophthalmic lenses they may lead to a manufacture of lenses that do not have the required specifications, and thus to a decrease of the production yield.

It is therefore an object of the invention to overcome the afore-mentioned disadvantages and to suggest appropriate measures to avoid a decrease of the production yield due to inserts being inaccurately mounted to the tooling plate of the injection-molding apparatus.

SUMMARY OF THE INVENTION

In accordance with the present invention, these and other objects are met by a method and an apparatus as specified by the features of the independent claims. Advantageous embodiments of the method and the apparatus according to the invention are the subject of the dependent claims.

As used in the specification including the appended claims, the singular forms "a", "an", and "the" include the plural, unless the context explicitly dictates otherwise. When using the term "about" with reference to a particular numerical value or a range of values, this is to be understood in the sense that the particular numerical value referred to in connection with the "about" is included and explicitly disclosed, unless the context clearly dictates otherwise. For example, if a range of "about" numerical value A to "about" numerical value B is disclosed, this is to be understood to include and explicitly disclose a range of numerical value A to numerical value B. Also, whenever features are combined with the term "or", the term "or" is to be understood to also include "and" unless it is evident from the specification that the term "or" must be understood as being exclusive.

According to the invention, a method for verifying whether a molding insert is accurately mounted to a tooling plate of an injection-molding apparatus for molding ophthalmic lens molds is suggested. The tooling plate has a mounting axis for the molding insert, and the method comprises:

a) providing a confocal sensor having a measurement beam;

b) arranging the confocal sensor relative to the tooling plate such that a reference plane of the confocal sensor as well as a reference plane of the tooling plate are normal to the mounting axis, with the reference plane of the confocal sensor being spaced from the reference plane of the tooling plate by a predetermined first distance;

c) with the aid of the measurement beam of the confocal sensor, measuring a second distance between the reference plane of the confocal sensor and a central impingement location of the measurement beam on a molding surface of the molding insert;

d) based on the measured second distance as well as based on the predetermined first distance, determining a third distance of the central impingement location on the molding surface of the molding insert relative to the reference plane of the tooling plate;

e) comparing the determined third distance with a predetermined target distance, and f) determining that the molding insert is accurately mounted to the tooling plate if the difference between the determined third distance and the predetermined target distance is less than a predetermined threshold difference.

According to one aspect of the method according to the invention, step b) comprises arranging the confocal sensor relative to the tooling plate such that a propagation axis of the measurement beam of the confocal sensor and the mounting axis of the tooling plate coincide.

In accordance with a further aspect of the method according to the invention, the method further comprises performing steps c)-f) for a plurality of non-central impingement locations on the molding surface of the molding insert.

According to a further aspect of the method according to the invention, performing steps c)-f) for the plurality of non-central impingement locations on the molding surface of the molding insert is performed with the non-central impingement locations on the molding surface of the molding insert being arranged within a radius of 4 mm around the central impingement location.

In accordance with a further aspect of the method according to the invention, performing steps c)-f) for the plurality of non-central impingement locations on the molding surface of the molding insert is performed with the non-central impingement locations on the molding surface of the molding insert being arranged along a meridian running through the central impingement location.

According to another aspect of the method according to the invention, steps c)-f) are sequentially performed for each of the central impingement location and the non-central impingement locations on the molding surface of the molding insert.

According to still a further aspect of the method according to the invention, steps c)-f) are simultaneously performed for each of the central impingement location and the non-central impingement locations on the molding surface of the molding insert.

According to another aspect of the method according to the invention, step f) is confirmed for at least 99.5% of the non-central impingement locations, in particular for 99.5% to 99.85%, of the non-central impingement locations.

In accordance with a further aspect of the method according to the invention, a plurality of molding inserts is mounted to the tooling plate, and the tooling plate is determined as being accurately set up if each individual molding insert of the plurality of molding inserts is determined as being accurately mounted to the tooling plate.

According to the invention, there is also suggested a system for verifying whether a molding insert is accurately mounted to a tooling plate of an injection-molding apparatus for molding ophthalmic lens molds. The system comprises:

a confocal sensor having a measurement beam and a confocal sensor reference plane;

a tooling plate having a mounting axis for a molding insert and a tooling plate reference plane normal to the mounting axis;

wherein the confocal sensor reference plane and the tooling plate reference plane are arranged parallel to each other normal to the mounting axis and spaced from one another by a predetermined first distance;

a molding insert mounted to the tooling plate and having a molding surface, and a processor configured to determine, based on a measured second distance between the confocal sensor reference plane and a central impingement location of the measurement beam on the molding surface of the molding insert as well as based on the predetermined first distance between the confocal sensor reference plane and the tooling plate reference plane, a third distance of the central impingement location on the molding surface of the molding insert relative to the tooling plate reference plane, and further configured to determine that the molding insert is accurately mounted to the tooling plate if the difference between the determined third distance and a predetermined target distance is less than a predetermined threshold difference.

According to one aspect of the system according to the invention, the confocal sensor further comprises a confocal sensor abutment surface extending in a plane parallel to the confocal sensor reference plane and a confocal sensor centering surface, and wherein the tooling plate further comprises a tooling plate abutment surface parallel to or coincident with the tooling plate reference plane and a tooling plate centering surface, the confocal sensor centering surface and the tooling plate centering surface being arranged such that after centering of the confocal sensor relative to the tooling plate through engagement of the confocal sensor centering surface and the tooling plate centering surface a propagation axis of the measurement beam of the confocal sensor and the mounting axis of the tooling plate coincide. Once the confocal sensor abutment surface is in abutment with the tooling plate abutment surface the confocal sensor reference plane and the tooling plate reference plane are spaced from one another by the predetermined first distance.

When the molding insert for molding an ophthalmic lens mold is accurately mounted to the tooling plate of the injection molding apparatus, the distance between the reference plane of the confocal sensor and the impingement location of the measurement beam on the molding surface of the molding insert may be measured with the aid of the measurement beam of the confocal sensor. Due to the distance between the reference plane of the confocal sensor and the reference plane of the tooling plate being known (this distance being predetermined), it is thus possible to determine the distance of the impingement location on the molding surface of the molding insert and the reference plane of the tooling plate, too. In case this impingement location is the central impingement location and the molding insert is accurately mounted to the tooling plate, the central impingement location is the apex of the molding surface of the molding insert. The distance of the apex from the reference plane of the tooling plate is known from the set-up scheme of the tooling plate, this set-up scheme specifying which molding insert is to be mounted to the tooling plate at which mounting location. Therefore, the target distance between the apex and the reference plane of the tooling plate is known for each individual molding insert to be mounted to the tooling plate from the set-up scheme. By determining the actual distance of the apex of the molding surface from the reference plane of the tooling plate (with the aid of the measurement of the distance between the reference surface of the confocal sensor and the apex as explained above) and comparing this actual distance of the apex with the target distance, it is possible to determine for each individual molding insert mounted to the tooling plate whether or not the respective molding insert is accurately mounted. The molding insert is determined to be accurately mounted to the tooling plate in case the difference between the actual distance of the apex and the target distance is less than a predetermined threshold distance. This can be further improved in case the individual data of the surface of each insert which have been measured with very high precision during an initial measurement of the inserts alone (i.e. without the insert being mounted to a tooling plate) prior to releasing the inserts for further use in the set-up of tooling plates for the manufacture of lens molds. If these data are tracked for each individual insert, it is not only ensured that the surfaces of all inserts forwarded to the set-up of tooling plates are within the specifications (i.e. within well-defined tolerances around the specified ideal geometry) but in addition the specific data of the surface of each individual insert are exactly known. It is then possible to further increase the accuracy of the verification process due to the data of each individual insert being exactly known (and not only knowing that the data of an insert are within the predefined tolerances around the specified ideal geometry).

For example, in case small particles get wedged or clamped between the back surface (opposite the molding surface) of the molding insert and the tooling plate during mounting the molding insert to the tooling plate, the actual distance between the central impingement location of the measurement beam on the molding surface of the molding insert (which is supposed to be the apex of the molding surface) and the reference surface of the confocal sensor deviates from the nominal distance. As a consequence, the actual distance between the central impingement location on the molding surface and the reference plane of the tooling plate deviates from the target distance, too. If this deviation of the actual distance from the target distance is larger than the predetermined threshold difference, the molding insert is determined as not being accurately mounted.

In case a plurality of different lens molds having different specifications are to be simultaneously produced using the same tooling plate, different molding inserts must be mounted to the tooling plate at different mounting locations in accordance with the given set-up scheme. In such case it may occur, that a molding insert is inadvertently mounted to a mounting location other than that defined by the set-up scheme. Such wrongly mounted molding inserts may also be detected by the method according to the invention.

One advantage of the invention therefore is that the verification of the accurate mounting of the molding insert can be performed prior to starting production of lens molds. By using a confocal sensor, the method benefits from the measurement principle of the confocal sensor. Confocal sensors allow for contactless distance measurements with high accuracy that is sufficient for the present invention. An example of a confocal sensor which is suitable for use in the method according to the invention is the confocal sensor of the type CL-P015 of the CL-3000 series which is available from the company Keyence Deutschland GmbH, Neu-Isenburg, Germany. Another example that is suitable for use in the method according to the invention is the confocal sensor of the type DT IF 2404/90-2 which is available from the company Micro-Epsilon Messtechnik GmbH & Co. KG, Ortenburg, Germany.

When the confocal sensor is arranged relative to the tooling plate such that the propagation axis of the measurement beam of the confocal sensor and the mounting axis of the tooling plate (for mounting the molding insert) coincide, the measurement set-up is simple and the measurement can be easily and quickly performed since coincidence of the propagation axis and the mounting axis can be easily achieved by providing centering surfaces on both the confocal sensor and the tooling plate. Upon engagement of the centering surfaces of the confocal sensor and the centering surfaces of the tooling plate the axes are caused to coincide, and thus the actual distance between the central impingement location on the molding surface (which is supposed to be the apex) and the reference surface of the tooling plate can be easily determined.

Such centering is of advantage, for example, in case a confocal sensor with a very small scanning spot of e.g. 25 µm diameter (and a high resolution) is used (such as the above-identified sensor of the type CL-P015 of the CL-3000 series from company Keyence Deutschland GmbH) and is manually placed by an operator on the tooling plate (in order to make the small scanning spot of the confocal sensor impinge exactly on the apex of the molding surface of the molding insert). However, generally it is not necessary neither for the confocal sensor nor for the tooling plate to have such centering surfaces, since once these centering surfaces are in engagement with one another the sensor may only be moved axially (i.e. along these centering surfaces) relative to the tooling plate (and thus relative to the molding surface of the molding insert mounted thereto). This means that it is only possible to measure the distance between the central impingement location on the molding surface of the molding insert and the reference plane of the confocal sensor with high accuracy. However, due to lateral movement of the sensor relative to the tooling plate (and thus relative to the moldings surface of the insert) being prevented by the engagement of the centering surfaces, measurements at impingement locations other than the central impingement location are not possible with a confocal sensor having such very small scanning spot. Measurement of the distance of the apex of the molding surface of the molding insert from the reference plane of the confocal sensor (and therefrom determining the distance between the apex of the molding surface from the reference plane of the tooling plate to verify accurate mounting) is in many instances sufficient.

On the other hand, in addition to determining the distance between the central impingement location on the molding surface (which is supposed to be the apex) and the reference surface of the tooling plate, it may be advantageous to be able to additionally determine the distance between a plurality of non-central impingement locations on the molding surface (i.e. locations on the molding surface other than the apex) and the reference plane of the tooling plate. This determination can be performed in the same manner as already explained above for the central impingement location, and possibly even using the same confocal sensor having the very small scanning spot (and a high resolution). However, in this case the confocal sensor and the tooling plate must be movable relative to each other at least in a plane (X-Y-plane) parallel to the reference planes of the confocal sensor and of the tooling plate (which are parallel to one another) in order to move the scanning spot over the molding surface of the molding insert. This can be achieved, for example, with a highly precise X-Y table on which the tooling plate is placed (i.e. the tooling plate is moved relative to the confocal sensor which is not moved). Alternatively, the confocal sensor may be moved in the X-Y plane relative to the tooling plate (and thus relative to the molding surface of the insert). And, depending on whether or not the confocal sensor is capable of measuring distances (in a Z-direction perpendicular to the X-Y plane) that cover the maximum sagittal height of the molding surface of the molding insert, a relative movement in Z-direction between the tooling plate (and the insert mounted thereto) and the confocal sensor may be required in addition.

Such additional determination of the distances between non-central impingement locations on the molding surface and the reference plane of the tooling plate has the advantage of being able to additionally verify the accurate mounting of the molding insert to the tooling plate based on additional actual distances which can be compared with corresponding (target) distances defined by the set-up scheme. This may further increase the reliability of the determination whether a molding insert is accurately mounted to the tooling plate and may also allow for the determination of the curvature (radius of curvature) of the molding surface of the molding insert which may further help determining whether the molding insert has been accurately mounted to the tooling plate. For example, the non-central impingement locations on the molding surface of the molding insert are arranged within a radius of 4 mm around the central impingement location (i.e. the non-central impingement locations are arranged on the molding surface of the molding insert within a radial distance of 4 mm from the central impingement location; and in case the propagation axis of the measurement beam of the confocal sensor and the mounting axis of the tooling plate coincide, this radial distance corresponds to the radial distance from the mounting axis or propagation axis).

The arrangement of the non-central impingement locations along a meridian running through the central impingement location allows for the use of confocal sensors including a line scanning mode (e.g. 3D line confocal sensors sold under the trademark FocalSpec® by the company LMI Technologies Inc., Vancouver, Canada, for example, such as the sensor LCI1220) in which the measurement beam is a straight scanning line impinging on the molding surface along the meridian running through the apex of the molding surface. In case the molding surface of the molding insert is scanned along the entire meridian (regardless of the type of confocal sensor used), in addition to determining whether the molding insert is accurately mounted to the tooling plate this may allow for a determination of the curvature (e.g. base curve radius or front curve radius) of the molding surface of the molding insert.

In case measurements are carried out for both central and non-central impingement locations on the molding surface, such measurements can be carried out either sequentially (e.g. with a confocal sensor having a small scanning spot, i.e. spot by spot) or simultaneously (e.g. with a sensor having a scanning line mode).

Reliability of the determination whether a molding insert is accurately mounted to the tooling plate may be further increased. Such further increase can be obtained in case the determination whether the difference between the actual distance of the non-central impingement locations on the molding surface of the molding insert and the reference plane of the tooling plate is smaller than the predetermined threshold difference is confirmed for at least 99.5%, in particular for 99.5% to 99.85%, of the non-central impingement locations (for the central impingement location this condition must be fulfilled in any event).

Typically, a plurality of inserts is mounted to the tooling plate. The tooling plate may be determined as being accurately set up if each individual molding insert of the plurality of molding inserts mounted to the tooling plate is determined as being accurately mounted to the tooling plate. This means, that only tooling plates are released for the production of lens molds which have passed the verification for each individual molding insert mounted to the tooling plate.

As regards the system according to the invention, the advantages are the same as those explained above for the method according to the invention. Providing the confocal sensor with a confocal sensor abutment surface and providing the tooling plate with a tooling plate abutment surface allows for accurate positioning of the confocal sensor reference plane relative to the tooling plate reference plane. Once the confocal sensor has measured the distance between the reference plane of the confocal sensor and the (central or non-central) impingement location, the processor makes the calculations necessary for determining whether or not the molding insert is accurately mounted to the tooling plate as described above for the method according to the invention.

In the configuration in which the propagation axis of the measurement beam of the confocal sensor and the mounting axis of the tooling plate coincide, this coincidence can be easily and quickly achieved with the aid of the confocal sensor centering surface and the tooling plate centering surface which—upon engagement thereof—provide for the desired coincidence of these axes.

BRIEF DESCRIPTION OF THE DRAWINGS

Further advantageous aspects of the invention become apparent from the following description of embodiments of the invention with the aid of the drawings, in which.

DESCRIPTION OF EMBODIMENTS

Figure 1:
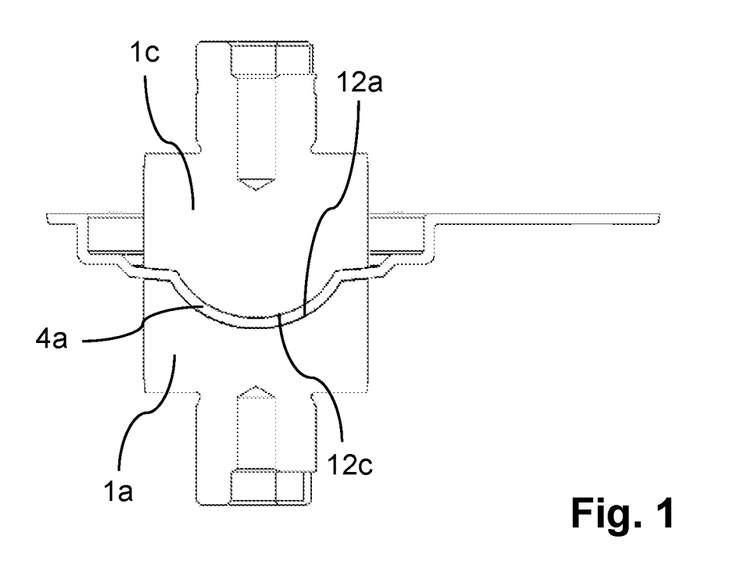
FIG. 1 shows two mated molding inserts for injection-molding of a male lens mold, with the male lens mold being illustrated between the two molding inserts.
Figure 2:
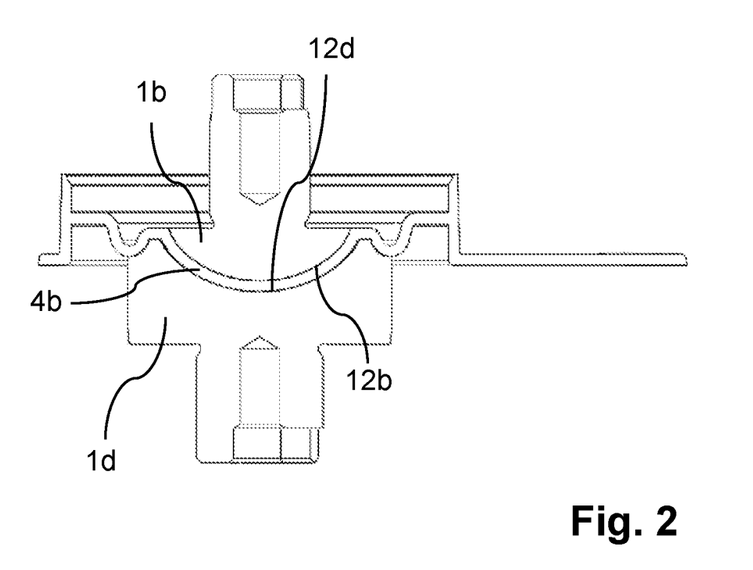
FIG. 2 shows two mated molding inserts for injection-molding of a female lens mold, with the female lens mold being illustrated between the two molding inserts.

FIG. 1 shows two mated molding inserts $1a$, $1c$ for injection-molding of a male lens mold $4a$. Each of the molding inserts $1a$, $1c$ is mounted to a tooling plate (not shown in FIG. 1). For the injection-molding of the male lens mold $4a$, the tooling plates with the molding inserts $1a$, $1c$ mounted thereto are closed such that a cavity is formed between them into which a hot flowable material (plastic, e.g. polypropylene) is injected through a hot runner opening out into the cavity. After injection, the hot flowable material in the cavity cools down to the solid state, thus forming the male lens mold $4a$. FIG. 2 illustrates two mated molding inserts $1b$ and $1d$ for injection-molding of a female lens mold 4b in the same manner. The geometry of the female lens mold 4b is different from that of the male lens mold 4a (and thus the molding inserts 1b, 1d are different from the molding inserts 1a, 1c), but otherwise the process of injection-molding of the female mold 4b is the same as that described for the male lens mold 4a.

For the production of ophthalmic lenses, in particular contact lenses such as soft contact lenses, using male lens mold 4a and female lens mold 4b, a predetermined quantity of lens-forming material is dispensed into female lens mold 4b, and subsequently male lens mold 4a and female lens mold 4b are mated to form a closed cavity that corresponds in shape to the contact lens to be formed by curing the lens-forming material contained in the cavity. Obviously, this requires that each of male lens mold 4a and female lens mold 4b has a lens-forming surface of optical quality (facing towards and bounding the cavity containing the lens-forming material) which determines the quality and shape of the corresponding surface (anterior or posterior surface) of the contact lens. Accordingly, the molding surface of the molding insert that determines the shape and quality of the lens-forming surface of the respective (i.e. male of female) lens mold must be of optical quality, too.

In the embodiment shown in FIG. 1 for injection-molding of male lens mold 4a, molding surface 12a of female molding insert 1a must be of optical quality as it is that surface of male lens mold 4a which forms the lens-forming surface of male lens mold 4a during injection-molding. Male molding insert 1c shown in FIG. 1 has a molding surface 12c that forms the back surface of male lens mold 4a and is not required (and may even be unwanted) to be of optical quality. For example, molding surface 12c of male molding insert 1c may even have a desired surface roughness (which may be obtained by laser-treatment) in order to facilitate removal of the male lens mold 4a after injection-molding. The molding insert having the molding surface of optical quality may be referred to as the 'optical tool' whereas the molding insert having the molding surface of non-optical quality may be referred to as the 'back piece'. Similar to what has been explained for male lens mold 4a with the aid of FIG. 1, in the embodiment shown in FIG. 2 male molding insert 1b has a molding surface 12b of optical quality (optical tool) whereas female molding insert 1d has a molding surface 12d of non-optical quality (back piece having a molding surface with a predetermined surface roughness, as mentioned above).

Accurate mounting of the (female and male) molding inserts 1a, 1b, 1c, 1d to the tooling plate is crucial for the subsequent injection-molding of the male and female lens molds 4a, 4b. In the following description of embodiments of the invention, the invention will be explained in more detail by way of example with the aid of the (male and female) molding inserts 1a, 1b having the molding surfaces 12a, 12b of optical quality (optical tool). However, the invention is not limited thereto, as the invention is applicable as well to the (female and male) molding inserts 1c, 1d having the (molding surfaces 12c, 12d of non-optical quality (back piece).

Figure 3:
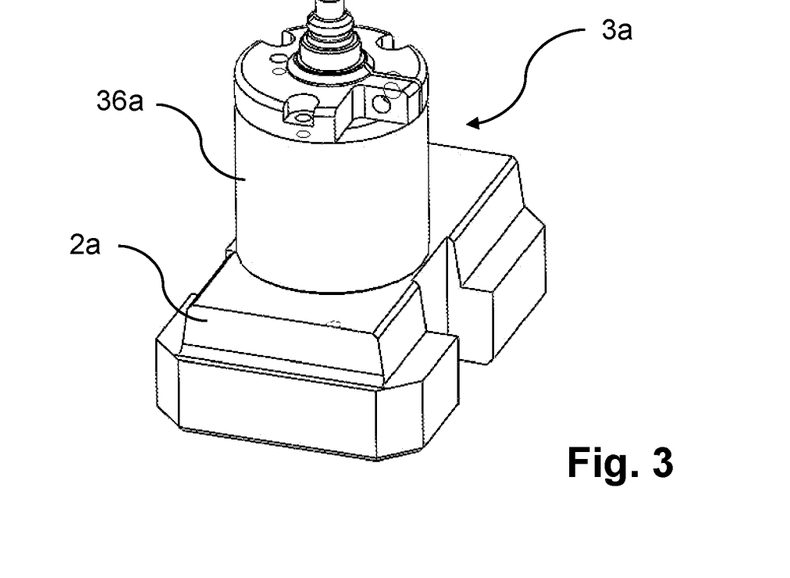
FIG. 3 shows a perspective view of an embodiment of some essential components of the system according to the invention, with a confocal sensor arranged on an optical tooling plate to which a female molding insert is mounted.
Figure 4:
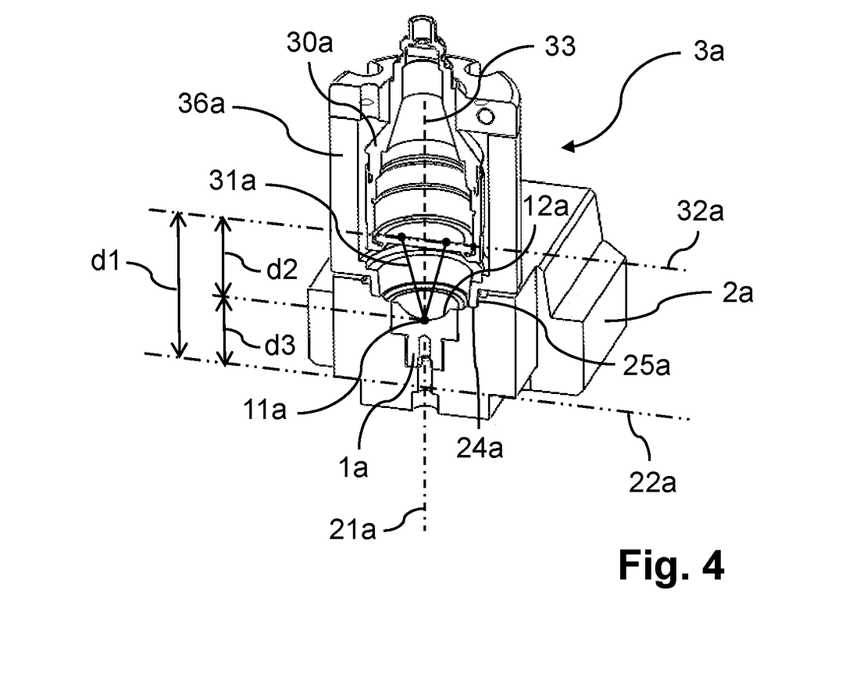
FIG. 4 shows a longitudinal cross-section of the embodiment shown in FIG. 3.
Figure 5:
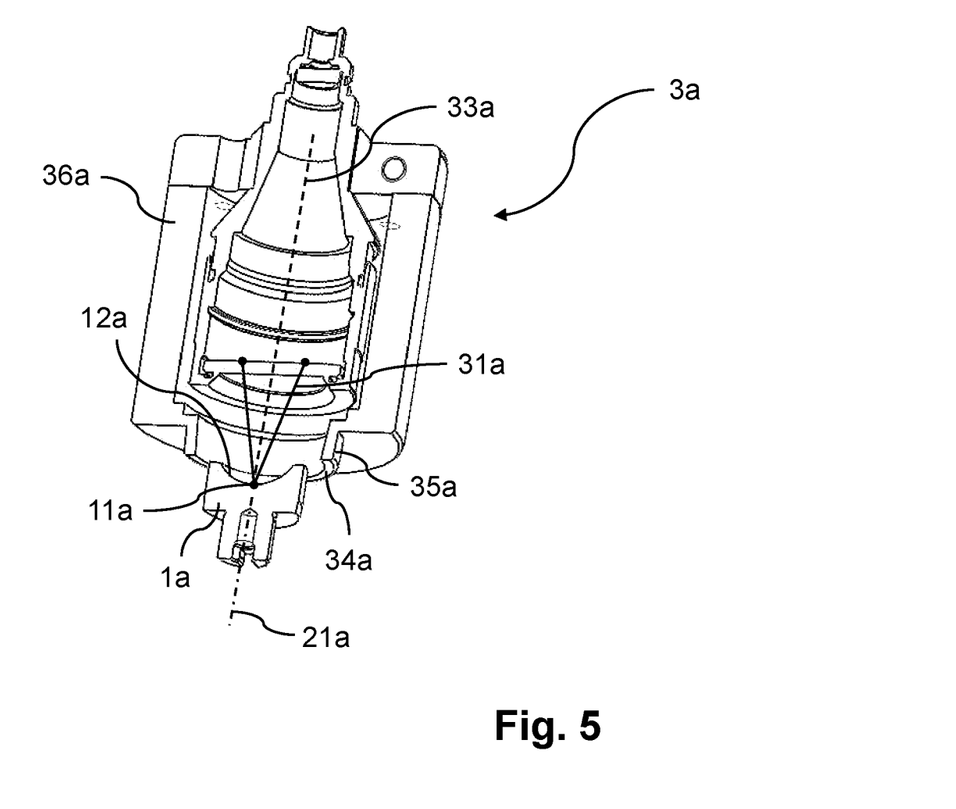
FIG. 5 shows the longitudinal cross-section shown in FIG. 4, however, with the female molding insert only (tooling plate not shown)

FIG. 3-FIG. 5 show an embodiment of essential components of an embodiment of the system according to the invention. In this embodiment, the female molding insert 1a (see FIG. 4 and FIG. 5) is mounted to the tooling plate 2a (only a portion or block of the tooling plate being shown), and a confocal sensor 3a is arranged on tooling plate 2a above the molding surface 12a of female molding insert 1a. The portion or block of tooling plate 2a shown may be a portion of a tooling plate comprising several such blocks or portions shown in FIG. 3. Confocal sensor 3a may comprise a sensor housing 36a the purpose of which is explained in more detail below, and a sensor head 30 arranged in sensor housing 36.

As can be seen in FIG. 4, female molding insert 1a is mounted to the tooling plate such that it is aligned with the mounting axis 21a of a cylindrical mounting bore of tooling plate 2a. In this embodiment, confocal sensor 3a comprises a commercially available sensor head 30a (e.g. the one of the type CL-P015 from the CL-3000 series available from the company Keyence Deutschland GmbH, Neu-Isenburg, Germany) which is rigidly mounted to the sensor housing 36a that allows for an accurate arrangement of confocal sensor 3a on tooling plate 2a. The accurate arrangement of confocal sensor 3a relative to tooling plate 2a includes the correct arrangement of confocal sensor 3a relative to the direction of the mounting axis 21a, such that a reference plane 32 of confocal sensor 3a and a reference plane 22a of tooling plate 2a are both normal to the mounting axis 21a and are spaced by a predetermined (i.e. known) first distance d1. The accurate arrangement of confocal sensor 3a further includes the coincidence of a beam propagation axis 33a of a measurement beam 31a (see FIG. 4 and FIG. 5) of confocal sensor 3a with mounting axis 21a of tooling plate 2a. To ensure the correct arrangement of confocal sensor 3a relative to tooling plate 2a, each of the confocal sensor 3a and the tooling plate 2a are provided with an abutment surface and with a centering surface.

In this embodiment, the confocal sensor abutment surface 34a is provided on the sensor housing 36a of confocal sensor 3a (see FIG. 5). The confocal sensor abutment surface 34a extends in a plane parallel to the confocal sensor reference plane 32a (see FIG. 4). When the confocal sensor 3a is arranged on tooling plate 2a such that confocal sensor abutment surface 34a and tooling plate abutment surface 24a are abutting one another, confocal sensor reference plane 32a and tooling plate reference plane 22a are arranged parallel to each other, and are spaced by the predetermined first distance d1.

Also, in this embodiment the confocal sensor centering surface 35a (which may be slightly conical) is provided on the sensor housing 36a of confocal sensor 3a (see FIG. 5) and extends coaxially about the propagation axis 33a of measurement beam 31a of confocal senor 3a. The tooling plate centering surface 25a (which may be a cylindrical surface) extends coaxially around the mounting axis 21a of tooling plate 2a.

During the arrangement of confocal sensor 3 on tooling plate 2a, engagement of confocal sensor centering surface 35a and tooling plate centering surface 25a results in a centering action that is continued until confocal sensor abutment surface 34a abuts against tooling plate abutment surface 24a. At that time, confocal sensor 3 is accurately arranged, with the reference plane 22a of tooling plate 2a and reference plane 32a of confocal sensor 3a being spaced by the predetermined first distance d1, and with the propagation axis 33a of measurement beam 31a being coincident with mounting axis 21a. In this configuration, during operation the measurement beam 31a impinges on molding surface 12a of female molding insert 1a at a central impingement location 11a, and confocal sensor 3a measures a second distance d2 between central impingement location 11 and confocal sensor reference plane 32a. In case female molding insert 1a is accurately mounted to tooling plate 2a, central impingement location 11a coincides with the apex of molding surface 12a of female molding insert 1a, with the apex being aligned with both the mounting axis 21a of tooling plate 2a and the propagation axis 33a of measurement beam 31 of confocal sensor 3a.

After measurement of the second distance d2 as described above, a third distance d3 between the central impingement location 11a and the reference plane 22a of tooling plate 2a can be determined (calculated) by subtracting the measured second distance d2 from the predetermined first distance d1 between the reference plane 32a of confocal sensor 3a and the reference plane 22a of tooling plate 2a. This predetermined first distance d1 is known (it depends on the known dimensions of the tooling plate 2a as well as on the known dimensions of confocal sensor 3a), and is stored in a set-up scheme in which it is also specified what molding insert is to be mounted to what mounting location on the tooling plate 2a.

This set-up scheme including the respective predetermined first distance d1 may be stored in the memory of a computer for each mounting location of the tooling plate 2a. Also, a predetermined target distance is stored in the set-up scheme for each mounting location on the tooling plate 2a, and this predetermined target distance depends on what molding insert is to be mounted to the respective mounting location on the tooling plate 2a. For the mounting location of female molding insert 1a described above, this predetermined target distance is the distance between the reference plane 22a of the tooling plate and the apex of the molding surface 12a of the accurately mounted female molding insert 1a.

After the third distance d3 between the central impingement location 11a on the molding surface 12a of female molding insert 1a and reference plane 22a of the tooling plate 2a has been determined as described above (i.e. based on the measured second distance d2 between the central impingement location 11a on the molding surface 12a of female molding insert and reference plane 32a of confocal sensor 3a), the so determined third distance d3 is compared with the target distance stored in the set-up scheme. If the difference between the third distance d3 (that has been determined based on the second distance d2 measured with the aid of confocal sensor 3a) and the target distance is less than a predetermined threshold difference, it is determined that the female molding insert 1a is accurately mounted to the tooling plate 2a.

The calculation of the third distance d3, the comparison of the third distance d3 with the target distance, and the subsequent determination whether or not the female molding insert 1a is accurately mounted to the tooling plate 2a may be performed by a suitable processor 5 (e.g. by a processor of the afore-mentioned computer). Although not shown, a display or screen may further be provided for displaying information indicative of whether or not the female molding insert 1a is accurately mounted to the tooling plate 2a.

In case of a plurality of molding inserts being mounted to the tooling plate 2a at different mounting locations on the tooling plate 2a, the afore-described measurement and determination of whether or not a molding insert is accurately mounted to the tooling plate 2a, is reiterated for each individual mounting location of the tooling plate 2a. In case all molding inserts mounted to the tooling plate 2a have been determined to be accurately mounted to the tooling plate 2a, the tooling plate 2a with the accurately mounted molding inserts may then be approved for being used in the injection-molding apparatus for the production of lens molds.

Figure 6:
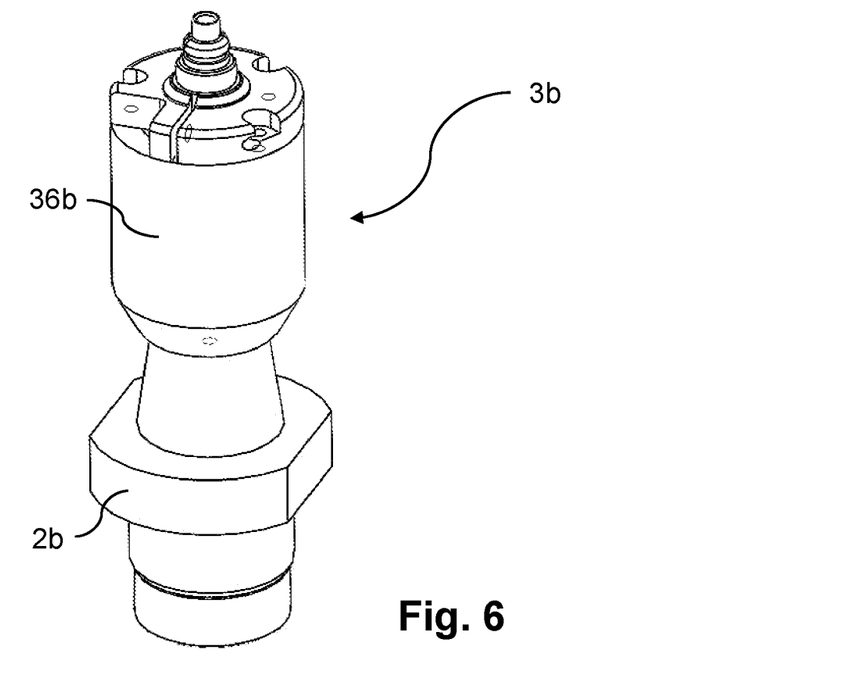
FIG. 6 shows a perspective view of a further embodiment of some essential components of the system according to the invention, with a confocal sensor arranged on an optical tooling plate to which a male molding insert is mounted.
Figure 7:
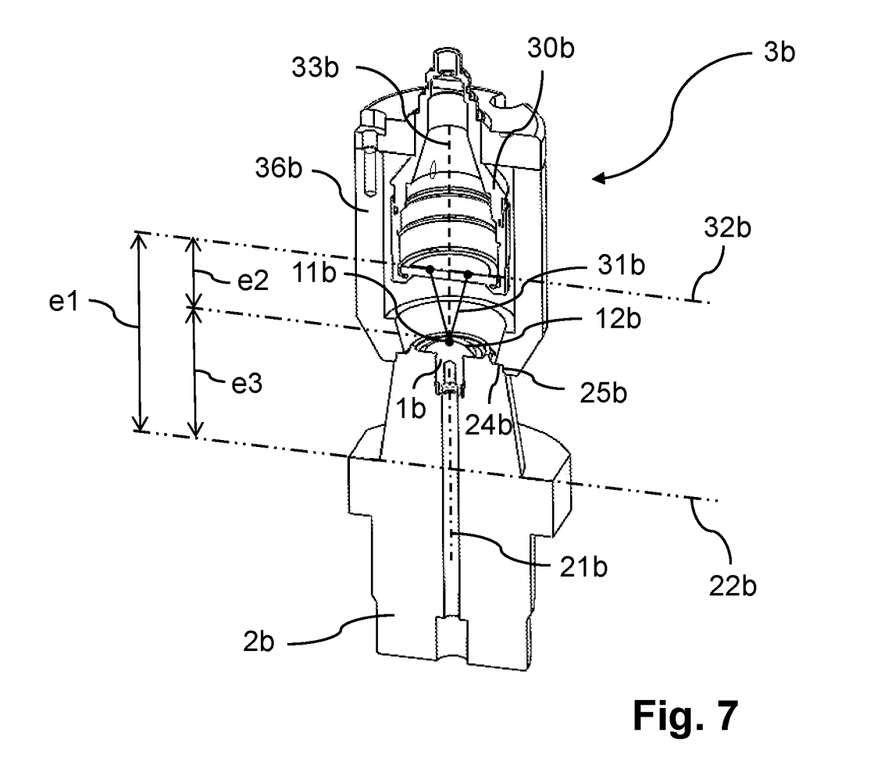
FIG. 7 shows a longitudinal cross-section of the embodiment shown in FIG. 6.
Figure 8:
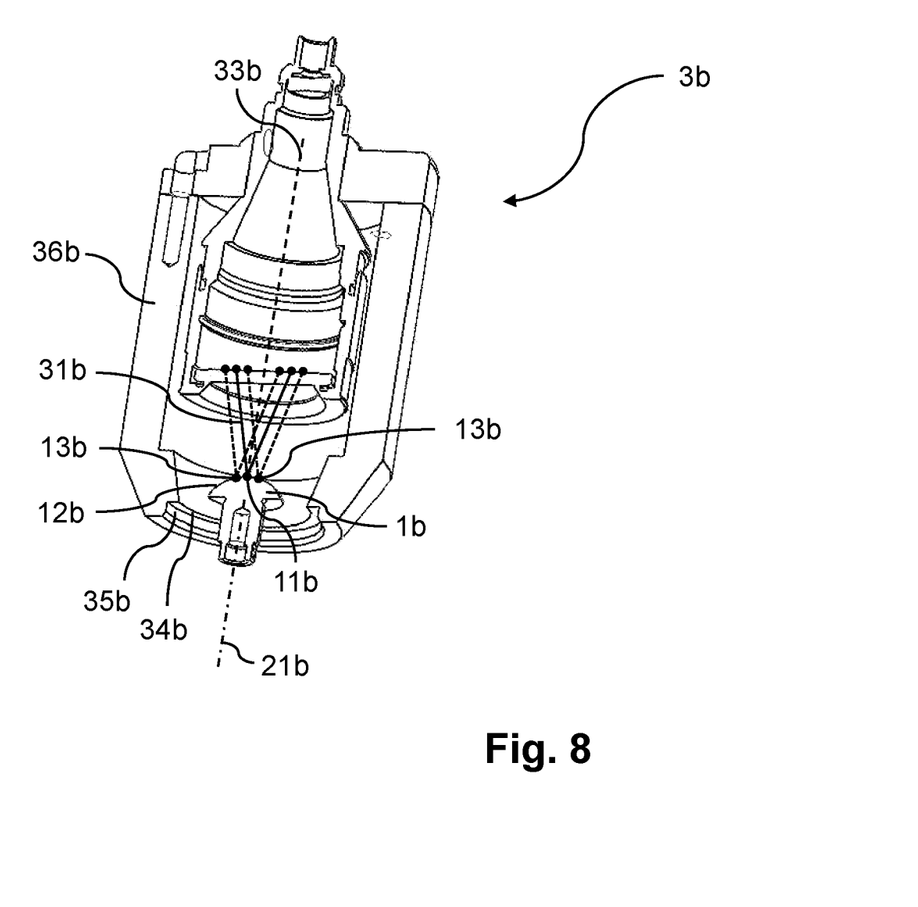
FIG. 8 shows the longitudinal cross-section shown FIG. 7, however, with the male molding insert only (tooling plate not shown).

FIG. 6-FIG. 8 show another embodiment of some essential components of the system according to the invention. While the embodiment of FIG. 3-FIG. 5 shows the female molding insert 1a (optical tool) for injection-molding of the (convex) lens-forming surface of male lens mold 4a (for forming the posterior surface of the contact lens) mounted to the respective tooling plate 2a, the embodiment of FIG. 6-FIG. 8 shows the male molding insert 1b (optical tool) for injection-molding of the (concave) lens-forming surface of female lens mold 4b (for forming the anterior surface of the contact lens) mounted to the respective tooling plate 2b. Since in principal the further embodiment shown in FIG. 6-FIG. 8 corresponds to the embodiment shown in FIG. 3-FIG. 5, the reference signs used in the embodiment shown in FIG. 6-FIG. 8 contain the letter 'b' instead of the letter 'a' that was used for the corresponding component of the embodiment shown in FIG. 3-FIG. 5. Accordingly, the male molding insert 1b is mounted to a portion or block of the tooling plate 2b (the shape of which is a little different from the portion or block of tooling plate 2a to which female molding insert 1a is mounted) and the confocal sensor 3b including sensor housing 36b is arranged on the tooling plate 2b above the molding surface 12b of male molding insert 1b. Sensor housing 36b is adapted in shape to the shape of the portion or block of tooling plate 2b to which male molding insert 1b is mounted. Accordingly, the confocal sensor abutment surface 34b and the confocal sensor centering surface 35b are provided on sensor housing 36b of confocal sensor 3b and are adapted to fit to the corresponding abutment surface 24b and centering surface 25b of tooling plate 2b. The somewhat different geometrical shape of the tooling plate 2b and of the sensor housing 36b lead to a modified predetermined first distance e1 between a reference plane 32b of confocal sensor 3b and a reference plane 22b of tooling plate 2b (and this predetermined first distance e1 again depends on the known dimensions of the tooling plate 2b as well as on the known dimensions of confocal sensor 3b). Also, the somewhat different geometrical shape may lead to a different measured second distance e2 between a central impingement location 11b of the measurement beam 31b on the molding surface 12b from and confocal sensor reference plane 32b. And finally, due to the somewhat different geometrical shape this may also lead to a different third distance e3 between the central impingement location 11b and the tooling plate reference plane 22b which is determined (calculated) by subtracting the second distance d2 (measured with the aid of the confocal sensor 3b) from the first predetermined distance (which is known from the dimensions of the tooling plate 2b and of the confocal sensor 3b).

Also here, after the third distance e3 between the central impingement location 11b on the molding surface 12b of female molding insert 1b and reference plane 22b of the tooling plate 2b has been determined as described above (i.e. based on the measured second distance e2 between the central impingement location 11b on the molding surface 12b of female molding insert and reference plane 32b of confocal sensor 3b), the so determined third distance e3 is compared with the target distance stored in the set-up scheme. If the difference between the third distance e3 (that has been determined based on the second distance e2 measured with the aid of confocal sensor 3b) and the target distance is less than a predetermined threshold difference, it is determined that the male molding insert 1b is accurately mounted to the tooling plate 2b.

The calculation of the third distance e3, the comparison of the third distance e3 with the target distance, and the subsequent determination whether or not the male molding insert 1a is accurately mounted to the tooling plate 2b may be performed by a suitable processor 5 (e.g. by a processor of the afore-mentioned computer). Although not shown, a display or screen may further be provided for displaying information indicative of whether or not the male molding insert 1b is accurately mounted to the tooling plate 2b.

In case of a plurality of molding inserts being mounted to the tooling plate 2b at different mounting locations, the afore-described measurement and determination of whether or not a molding insert is accurately mounted to the tooling plate 2b, is reiterated for each individual mounting location of the tooling plate 2b. In case all molding inserts mounted to the tooling plate 2b have been determined to be accurately mounted to the tooling plate 2b, the tooling plate 2b with the accurately mounted molding inserts may then be approved for being used in the injection-molding apparatus for the production of lens molds.

In FIG. 8 some additional aspects are shown which will be discussed in the following. As can be seen there, the measurement with the aid of confocal sensor 3b and the subsequent calculation/determination steps are performed not only for the central impingement location 11b but also for additional, non-central impingement locations 13b on the molding surface 12b of molding insert 1b. For the sake of simplicity, two such non-central impingement locations 13b are shown in FIG. 8 by way of example, however, of course the invention is not limited to the measurement of only two such non-central impingent locations 13b. Rather, a plurality of non-central impingement locations 13b may be measured with the aid of confocal sensor 3b, and this plurality may comprise significantly more than just two non-central impingement locations 13b. These non-central impingement locations 13b may be measured simultaneously or sequentially (i.e. one after the other), depending on the type of confocal sensor actually used. For the confocal sensor 3b shown in FIG. 8 producing a small scanning spot on the molding surface 12b of the molding insert 1b at the central impingement location 11b, this would mean that the tooling plate (not shown) with the molding insert 1b mounted thereto and the confocal sensor 3b would have to be moved relative to one another (e.g. by moving the tooling plate and the molding insert 1b mounted thereto with the aid of an X-Y table on which the tooling plate may be placed, as has been explained further above) such that after such relative movement the scanning spot is produced at one of the non-central impingement locations 13b. This is schematically indicated by the dashed lines in FIG. 8, although the measurement beam of the confocal sensor 3b actually does not emanate from a different location in the confocal sensor, this is depicted in FIG. 8 only for the sake of better illustrating the position of the non-central impingement locations 13b on the molding surface 12b of the molding insert 1b. For example, the non-central impingement locations 13b may be located within a radius of 4 mm around the central impingement location 11b. Alternatively, a different type of confocal sensor may be used which is capable of generating a measurement beam producing a straight scanning line impinging on the molding surface of the molding insert along a meridian that runs through the central impingement location 11b on the molding surface 12b, and thus simultaneously generates quite a large number of additional non-central impingement locations 13b in addition to the central impingement location 11b. For example, the scanning line may impinge on the molding surface 12b along the entire meridian, so that in addition to the determination whether or not the molding insert 1b is accurately mounted to the tooling plate it is also possible to additionally determine the radius of curvature of the entire molding surface 12b of the molding insert 11b (along the scanned meridian).

In case the distance between the non-central impingement locations 13b and the confocal sensor reference plane 32b is measured in addition to the distance between the central impingement location 11b and the confocal sensor reference plane 32b, it is possible to determine for each of these non-central impingement locations whether or not the difference between the target distance (stored in the set-up scheme) and the calculated distance between these impingement locations and the tooling plate reference surface 22b is less than the predetermined threshold. And it may then be possible to determine that a molding insert is accurately mounted to the tooling plate 2b only in case this difference is smaller than the predetermined threshold for more than 95%, in particular 99.5 to 99.85% of these non-central impingement locations (for the central impingement location this condition must be fulfilled in any event).

Again, in case of a plurality of molding inserts being mounted to the tooling plate 2b at different mounting locations, the afore-described additional requirement may need to be fulfilled at each mounting location on the tooling plate 2b prior to approving/releasing the respective tooling plate 2b for being used in the injection-molding apparatus for the production of lens molds.

Embodiments of the invention have been described by way of example with the aid of the drawings. However, the invention is not limited to these embodiments but rather many changes and modifications are possible without departing from the teaching of the instant invention. The scope of protection is therefore defined by the appended claims.

What is claimed is:

1. A method for verifying whether a molding insert (1a, 1b) is accurately mounted to a tooling plate (2a, 2b) of an injection-molding apparatus for molding ophthalmic lens molds, the tooling plate (2a, 2b) having a mounting axis (21a, 21b) for the molding insert (1a, 1b), the method comprising the steps of:
    a) providing a confocal sensor (3a, 3b) having a measurement beam (31a, 31b);
    b) arranging the confocal sensor (3a, 3b) relative to the tooling plate (2a, 2b) such that a reference plane (32a, 32b) of the confocal sensor (3a, 3b) as well as a reference plane (22a, 22b) of the tooling plate (2a, 2b) are normal to the mounting axis (21a, 21b), with the reference plane (32a, 32b) of the confocal sensor (3a, 3b) being spaced from the reference plane (22a, 22b) of the tooling plate (2a, 2b) by a predetermined first distance (d1, e1);
    c) with the aid of the measurement beam (31a, 31b) of the confocal sensor (3a, 3b), measuring a second distance (d2, e2) between the reference plane (32a, 32b) of the confocal sensor (3a, 3b) and a central impingement location (11a, 11b) of the measurement beam (31a, 31b) on a molding surface (12a, 12b) of the molding insert (1a, 1b);
    d) based on the measured second distance (d2, e2) as well as based on the predetermined first distance (d1, e1), determining a third distance (d3, e3) of the central impingement location (11a, 11b) on the molding surface (12a, 12b) of the molding insert (1a, 1b) relative to the reference plane (22a, 22b) of the tooling plate (2a, 2b);
    e) comparing the determined third distance (d3, e3) with a predetermined target distance, and
    f) determining that the molding insert (1a, 1b) is accurately mounted to the tooling plate (2a, 2b) if the difference between the determined third distance (d3, e3) and the predetermined target distance is less than a predetermined threshold difference.

2. A method according to claim 1, wherein step b) comprises arranging the confocal sensor (3a, 3b) relative to the tooling plate (2a, 2b) such that a propagation axis (33a, 33b) of the measurement beam (31a, 31b) of the confocal sensor (3a, 3b) and the mounting axis (21a, 21b) of the tooling plate (2a, 2b) coincide.

3. A method according to claim 1, further comprising performing steps c)-f) for a plurality of non-central impingement locations (13b) on the molding surface (12b) of the molding insert (1b).

4. A method according to claim 3, wherein performing steps c)-f) for the plurality of non-central impingement locations (13b) on the molding surface (12b) of the molding insert (1b) is performed with the non-central impingement locations (13b) on the molding surface (12b) of the molding insert (1b) being arranged within a radius of 4 mm around the central impingement location (11b).

5. A method according to claim 3, wherein performing steps c)-f) for the plurality of non-central impingement locations (13b) on the molding surface (12b) of the molding insert (1b) is performed with the non-central impingement locations (13b) on the molding surface (12b) of the molding insert (1b) being arranged along a meridian running through the central impingement location (11b).

6. A method according to claim 3, wherein steps c)-f) are sequentially performed for each of the central impingement location (11b) and the non-central impingement locations (13b) on the molding surface (12b) of the molding insert (1b).

7. A method according to claim 3, wherein steps c)-f) are simultaneously performed for each of the central impingement location (11b) and the non-central impingement locations (13b) on the molding surface (12b) of the molding insert (1b).

8. A method according to claim 3, wherein step f) is confirmed for at least 99.5% of the non-central impingement locations (13b).

9. A method according to claim 1, wherein a plurality of molding inserts (1a, 1b) is mounted to the tooling plate (2a, 2b), and wherein the tooling plate is determined as being accurately set up if each individual molding insert (1a, 1b) of the plurality of molding inserts (1a, 1b) is determined as being accurately mounted to the tooling plate (2a, 2b).

10. A system for verifying whether a molding insert (1a, 1b) is accurately mounted to a tooling plate (2a, 2b) of an injection-molding apparatus for molding ophthalmic lens molds, the system comprising:
  a confocal sensor (3a, 3b) having a measurement beam (31a, 31b) and a confocal sensor reference plane (32a, 32b);
  a tooling plate (2a, 2b) having a mounting axis (21a, 21b) for a molding insert (1a, 1b) and a tooling plate reference plane (22a, 22b) normal to the mounting axis (21a, 21b);
    wherein the confocal sensor reference plane (32a, 32b) and the tooling plate reference plane (22a, 22b) are arranged parallel to each other normal to the mounting axis (21a, 21b) and spaced from one another by a predetermined first distance (d1, e1);
  a molding insert (1a, 1b) mounted to the tooling plate (2a, 2b) and having a molding surface (12a, 12b), and
  a processor (5) configured to determine, based on a measured second distance (d2, e2) between the confocal sensor reference plane (32a, 32b) and a central impingement location (11a, 11b) of the measurement beam (31a, 31b) on the molding surface (12a, 12b) of the molding insert (1a, 1b) as well as based on the predetermined first distance (d1, e1) between the confocal sensor reference plane (32a, 32b) and the tooling plate reference plane (22a, 22b), a third distance (d3, e3) of the central impingement location (11a, 11b) on the molding surface (12a, 12b) of the molding insert (1a, 1b) relative to the tooling plate reference plane (22a, 22b), and further configured to determine that the molding insert (1a, 1b) is accurately mounted to the tooling plate (2a, 2b) if the difference between the determined third distance (d3, e3) and a predetermined target distance is less than a predetermined threshold difference.

11. A system according to claim 10, wherein the confocal sensor (3a, 3b) further comprises a confocal sensor abutment surface (34a, 34b) extending in a plane parallel to or coincident with the confocal sensor reference plane (32a, 32b) and a confocal sensor centering surface (35a, 35b), and wherein the tooling plate (2a, 2b) further comprises a tooling plate abutment surface (24a, 24b) parallel to or coincident with the tooling plate reference plane (22a, 22b) and a tooling plate centering surface (25a, 25b), the confocal sensor centering surface (35a, 35b) and the tooling plate centering surface (25a, 25b) being arranged such that after centering of the confocal sensor (3a, 3b) relative to the tooling plate (2a, 2b) through engagement of the confocal sensor centering surface (35a, 35b) and the tooling plate centering surface (25a, 25b) a propagation axis (33a, 33b) of the measurement beam (31a, 31b) of the confocal sensor (3a, 3b) and the mounting axis (21a, 21b) of the tooling plate (2a, 2b) coincide, and once the confocal sensor abutment surface (34a, 34b) is in abutment with the tooling plate abutment surface (24a, 24b) the confocal sensor reference plane (32a, 32b) and the tooling plate reference plane (22a, 22b) are spaced from one another by the predetermined first distance (d1, e1).

\* \* \* \* \*